(12) United States Patent
Recknagel et al.

(10) Patent No.: US 9,868,149 B2
(45) Date of Patent: Jan. 16, 2018

(54) FEEDER AND SHAPEABLE COMPOSITION FOR PRODUCTION THEREOF

(75) Inventors: Ulrich Recknagel, Zwickau (DE); Ulrich Lanver, Langenfeld (DE)

(73) Assignee: CHEMEX GMBH, Delligsen (DE)

( * ) Notice: Subject to any disclaimer, the term of this patent is extended or adjusted under 35 U.S.C. 154(b) by 1025 days.

(21) Appl. No.: 14/234,315

(22) PCT Filed: Jul. 23, 2012

(86) PCT No.: PCT/EP2012/064378
§ 371 (c)(1),
(2), (4) Date: Apr. 10, 2014

(87) PCT Pub. No.: WO2013/014118
PCT Pub. Date: Jan. 31, 2013

(65) Prior Publication Data
US 2014/0235750 A1     Aug. 21, 2014

(30) Foreign Application Priority Data

Jul. 22, 2011 (DE) .................. 10 2011 079 692

(51) Int. Cl.
*B22C 1/08* (2006.01)
*C04B 18/10* (2006.01)
*B22C 1/02* (2006.01)

(52) U.S. Cl.
CPC .............. *B22C 1/08* (2013.01); *B22C 1/02* (2013.01); *C04B 18/101* (2013.01)

(58) Field of Classification Search
CPC . C04B 18/101; C04B 35/62213; C01B 33/12; C01B 33/113; C01B 33/185
See application file for complete search history.

(56) References Cited

U.S. PATENT DOCUMENTS

| | | | |
|---|---|---|---|
| 4,555,448 A | 11/1985 | Durham | |
| 5,346,548 A * | 9/1994 | Mehta | C04B 18/101 106/705 |
| 6,342,088 B1 * | 1/2002 | Klatt | C04B 18/023 75/300 |
| 6,346,146 B1 * | 2/2002 | Duselis | C04B 18/021 106/470 |
| 7,585,481 B2 * | 9/2009 | Dodson | C01B 33/126 423/335 |

FOREIGN PATENT DOCUMENTS

| | | |
|---|---|---|
| CN | 1115978 | 1/1996 |
| CN | 1529641 | 9/2004 |
| DE | 3516033 | 11/1986 |
| DE | 19731653 | 1/1999 |
| DE | 19728368 | 3/1999 |
| DE | 102005025771 | 12/2006 |
| GB | 1432707 | 4/1976 |
| JP | S5983974 U | 5/1984 |

* cited by examiner

*Primary Examiner* — Robert C Boyle
(74) *Attorney, Agent, or Firm* — Duane Morris LLP; J. Rodman Steele, Jr.; Gregory M. Lefkowitz

(57) ABSTRACT

Feeders for use in the foundry industry comprising (a) rice husk ash containing, based on the total amount of the constituents detectable in the rice husk ash by quantitative phase analysis by means of x-ray diffractometry (i) crystalline modifications of silicon dioxide, (ii) monoclinic feldspar and (iii) amorphous silicon dioxide, a total content of at least 70 wt. %, preferably more than 75 wt. % of (i) crystalline modifications of silicon dioxide and (ii) monoclinic feldspar, wherein, based on the total weight of the shapeable composition of the feeder, the amount of this rice husk ash is in the range of from 5 to 50 wt. %, preferably 5 to 25 wt. %, (b) cured binder, (c) optionally fiber material, (d) optionally one or more further fillers, and (e) optionally an oxidizable metal and an oxidizing agent for the oxidizable metal are described.

14 Claims, 1 Drawing Sheet

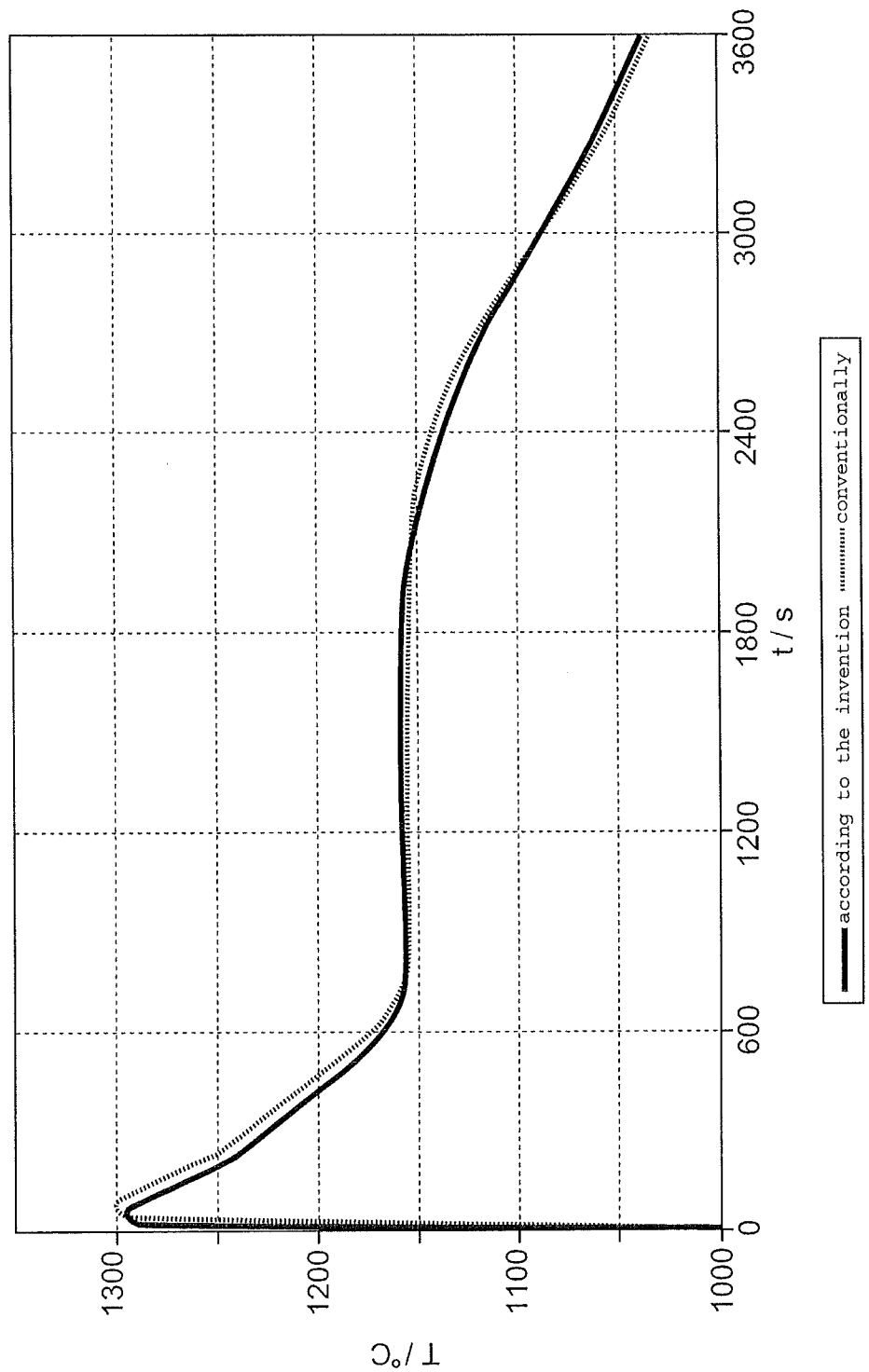

FEEDER AND SHAPEABLE COMPOSITION FOR PRODUCTION THEREOF

CROSS-REFERENCE TO RELATED APPLICATIONS

This application is a § 371 national stage entry of International Application No. PCT/EP2012/064378, filed Jul. 23, 2012, which claims priority to German Patent Application No. 102011079692.4 filed Jul. 22, 2011, the entire contents of which are incorporated herein by reference.

The present invention relates to the use of a lightweight filler in a shapeable composition for the production of feeders for the foundry industry, corresponding shapeable compositions and their preparation and feeders for the foundry industry. In the context of the present text, the term "feeder" here includes feeder sleeves, feeder inserts and feeder caps as well as heating pads.

In the production of metallic formed parts in the foundry industry, liquid metal is introduced into a casting mould and solidifies there. The solidification operation is associated with a reduction in the volume of metal, and feeders are therefore regularly employed in or on the casting mould in order to compensate the volume deficit during solidification of the casting and in this way prevent shrinkage in the casting. The feeders are connected to the casting or the region of the casting at risk and are usually located above and/or on the side of the mould cavity.

With respect to the compositions known to date for the production of feeders for the casting industry, a distinction is made between two main groups:

A. Insulating compositions, i.e. shapeable and curable compositions (masses) for production of thermally insulating feeder sleeves or insulating pads or pockets. The (cured) insulating composition first takes up some heat from the liquid metal during casting of the mould, until a temperature balance is established; from this point in time on, the insulating composition protects the liquid casting metal against further heat losses for a certain time. Feeders or insulating pockets formed from insulating compositions therefore delay the start of solidification and promote tight feeding of a casting. Insulating compositions regularly comprise at least one particulate (granular) filler and a binder.

B. Exothermic feeder heating compositions, i.e. shapeable and curable exothermic compositions (masses) which heat by themselves by an aluminothermal or similar reaction during casting of the mould. Feeders which are employed in the mould and can generate heat in contact with the melt can be produced from exothermic feeder heating compositions (also called exothermic forming materials). In this context, heat is released on the basis of the aluminothermal or similar conversion reaction in the heating composition. In exceptional cases, the heat liberated serves to heat up the liquid metal in the feeder, but at any rate to (partially) compensate for the heat losses. If feeders with exothermic heating compositions are used, the metal remains liquid for longer compared with feeders based on insulating compositions (see A above). Tight feeding of a casting can therefore be improved and smaller feeders may be used if appropriate, so that the circulating content is lowered and the casting yield is increased. However, exothermic feeder heating compositions are considerably more expensive than insulating compositions. Exothermic feeder heating compositions regularly comprise at least one particulate (granular) filler, a binder, a relatively high content of an oxidizable metal and an oxidizing agent for the oxidizable metal (e.g. potassium nitrate or sodium nitrate). The oxidizable metal is preferably a base metal. The oxidizable metal is preferably chosen from the group consisting of aluminium, magnesium, calcium and silicon.

DE 10 2005 025 771 discloses an insulating feeder comprising ceramic hollow spheres, glass hollow spheres with a bulk density of less than 0.3 g/cm$^3$, cured binder and optionally fibre material. The weight ratio of ceramic hollow spheres to glass hollow spheres in this context is in the range of from 1:1 to 10:1, preferably in the range of from 2:1 to 6:1, and the total amount of glass hollow spheres and ceramic hollow spheres is in the range of from 40 to 80 wt. %, preferably in the range of from 40 to 60 wt. %, based on the total weight of the feeder. The feeder according to DE 10 2005 025 771 optionally contains further materials which can be called fillers. The presence of biogenic silica, e.g. in the form of rice husk ash (according to DE 10 2005 025 771 obtainable under the product name Silimat® G (product name currently Nermat AF) from Refratechnik Casting GmbH) is advantageous e.g. if a nanocomposite binder is employed.

Rice husk ash consists to the extent of more than 90 wt. %, conventionally to the extent of 92 to 97 wt. %, of silicon dioxide (silica) Rice husk ash of the type Nermat AF contains, based on the total amount of the constituents detectable in the rice husk ash by quantitative phase analysis by means of x-ray diffractometry
  (i) crystalline modifications of silicon dioxide,
  (ii) monoclinic feldspar and
  (iii) amorphous silicon dioxide,
a total content of less than 70 wt. % of
  (i) crystalline modifications of silicon dioxide and
  (ii) monoclinic feldspar,
while the content (iii) of the amorphous silicon dioxide in the total amount of the rice husk ash constituents detectable by quantitative phase analysis by means of x-ray diffractometry is 30 wt. % or more, often even more than 40 wt. %. The carbon content of rice husk ash of the Nermat AF type is up to 1.5 wt. %. Based on the total weight of the shapeable composition which has been employed for production of the insulating feeder, the amount of this rice husk ash can be up to 15 wt. % and is conventionally between 3 and 5 wt. %.

DE 197 28 368 C1 discloses an insulating material for casting steel consisting of finely powdered acid or basic insulating agents which are combined in a matrix of a gel-forming material to form granules. Rice husk ash is disclosed as an example of an acid insulating agent (covering agent). According to DE 197 28 368 C1, the majority of the silica in the rice husk ash is present in the amorphous form, but during combustion of rice husks a content of silicon dioxide, which can be between 5 and 30%, is converted into a crystalline form.

DE 197 31 653 C2 discloses a process for the production of spheres or pellets from rice husk ash which can be used as a thermal insulating material. According to DE 197 31 653 C2, when a rice husk is burned it leaves behind an ash which chiefly consists of silicon dioxide in the amorphous form.

U.S. Pat. No. 4,555,448 A1 discloses a material for thermal insulation which contains particles of biogenic silicon dioxide in the amorphous state, preferably rice husk ash.

SUMMARY OF THE INVENTION

Hollow spheres which are suitable for use in feeders are not available without limitation. It was therefore the object of the present invention to provide a lightweight filler which can serve as an at least partial substitute for the hollow spheres currently predominantly used in shapeable compositions for the production of feeders, and to provide a corresponding feeder. By replacing the hollow spheres, neither the insulating action nor the strength of the feeder should be impaired. The lightweight filler should therefore meet the following primary requirements:

heat stability also at temperatures of more than 1,400° C., preferably at temperatures of more than 1,500° C.;
adequate mechanical stability also at temperatures of more than 1,400° C., preferably at temperatures of more than 1,500° C.;
little or no dust adhesion;
bulk density below 800 g/l;
thermal conductivity below 0.15 W/mK at 100° C. and below 0.5 W/mK at 1,000° C.

In the context of the present text, a particle or material is stable if below a given temperature it neither melts nor softens with loss of spatial configuration or decomposes.

The lightweight filler should moreover be suitable both for insulating and for exothermic feeders.

The invention also relates to feeders for use in the foundry industry, shapeable compositions for the production of feeders and processes for the preparation of shapeable compositions for the production of feeders.

BRIEF DESCRIPTION OF THE DRAWINGS

FIG. 1 is a chart showing cooling curves for a feeder cap as described herein and a feeder cap made using a conventional exothermic shapeable composition.

DETAILED DESCRIPTION OF THE INVENTION

The object described is achieved according to the invention by the use of rice husk ash which contains, based on the total amount of the constituents detectable in the rice husk ash by quantitative phase analysis by means of x-ray diffractometry
  (i) crystalline modifications of silicon dioxide,
  (ii) monoclinic feldspar and
  (iii) amorphous silicon dioxide,
a total content of at least 70 wt. %, preferably more than 75 wt. % of (i) crystalline modifications of silicon dioxide and
  (ii) monoclinic feldspar
as a lightweight filler in a shapeable composition for the production of feeders for the foundry industry, and by a feeder comprising
  (a) rice husk ash containing, based on the total amount of the constituents detectable in the rice husk ash by quantitative phase analysis by means of x-ray diffractometry
    (i) crystalline modifications of silicon dioxide,
    (ii) monoclinic feldspar and
    (iii) amorphous silicon dioxide,
    a total content of at least 70 wt. %, preferably more than 75 wt. % of
    (i) crystalline modifications of silicon dioxide and
    (ii) monoclinic feldspar, wherein,
    based on the total weight of the shapeable composition of the feeder, the amount of this rice husk ash is in the range of from 5 to 50 wt. %, preferably 5 to 25 wt. %,
  (b) cured binder,
  (c) optionally fibre material,
  (d) optionally one or more further fillers and
  (e) optionally (in the case of an exothermic feeder) an oxidizable metal (such as e.g. aluminium, magnesium or silicon) and an oxidizing agent for the oxidizable metal.

Rice husk ash (a) to be employed according to the invention which contains, based on the total amount of the constituents detectable in the rice husk ash by quantitative phase analysis by means of x-ray diffractometry
  (i) crystalline modifications of silicon dioxide,
  (ii) monoclinic feldspar and
  (iii) amorphous silicon dioxide,
a total content of at least 70 wt. %, preferably more than 75 wt. % of
  (i) crystalline modifications of silicon dioxide and
  (ii) (ii) monoclinic feldspar
is also called highly crystalline rice husk ash in the following.

The rice husk ash known from the documents DE 197 28 368 C1, DE 197 31 653 C2 and U.S. Pat. No. 4,555,448 A1 is not highly crystalline rice husk ash in the context of the above definition, since it contains silicon dioxide predominantly in the amorphous form. The same applies accordingly to the rice husk ash employed according to DE 10 2005 025 771. From DE 10 2005 025 771, namely, it does not emerge that the rice husk ash employed there was prepared other than by the conventional process of combustion of rice husks, in which, as in known from the documents DE 197 28 368 C1, DE 197 31 653 C2 and U.S. Pat. No. 4,555,448 A1, a rice husk ash which contains silicon dioxide predominantly in the amorphous form is formed.

Feldspar is an aluminium silicate having a composition within the ternary system $K_2O.Al_2O_3.6SiO_2$—$Na_2O.Al_2O_3.6SiO_2$—$CaO.Al_2O_3.2SiO_2$.

Rice husk ash typically contains between 92 and 97 wt. % of silicon dioxide, the remaining relevant constituents being oxides of sodium, potassium, calcium, magnesium, aluminium and iron as well as carbon and water (as moisture and as water of crystallization). In the highly crystalline rice husk ash (a) to be employed in the feeders according to the invention, a content of more than 75 wt. % of the constituents detectable in the rice husk ash by quantitative phase analysis by means of x-ray diffractometry (i) crystalline modifications of silicon dioxide, (ii) monoclinic feldspar and (iii) amorphous silicon dioxide is formed by (i) crystalline modifications of silicon dioxide and (ii) feldspar, while the content (iii) of amorphous silicon dioxide in the total amount of the rice husk ash constituents detectable by quantitative phase analysis by means of x-ray diffractometry is less than 25 wt. %, particularly preferably less than 20 wt. % or even less than 15 wt. %. The content present in the form of crystalline modifications of the silicon dioxide contained in the highly crystalline rice husk ash contains proportions of one or more crystalline modifications of silicon dioxide from the group consisting of cristobalite, tridymite and quartz. The highly crystalline rice husk ash (a) furthermore if applicable contains (ii) monoclinic feldspar.

The use of x-ray diffractometry on polycrystalline and amorphous materials for non-destructive testing is described inter alia in the standard DIN EN 13925-1. X-ray powder diffractometry (XRPD—x-ray powder diffraction) is a method of non-destructive testing (NDT) which allows the nature and amount of the phases contained in a sample to be determined. A "phase" (in the sense of a "crystallographic phase" or a "thermodynamic phase") is understood as meaning a part of a physical system which shares a common molecular or intermolecular structure, independently of a further sub-division with respect to size distribution or form.

If the sample to be analysed is a mixture of two or more known phases (which have been determined e.g. as the result of a radiographic phase identification), at least one of which is a crystalline phase, the volume or weight content of each of the crystalline phases and of the amorphous content can be determined. Quantitative phase analysis is based on the evaluation of integral intensities of one or more diffraction lines, peak heights being used as an approximation of the integral intensities in certain cases.

The carbon content of the rice husk ash (a) to be employed in feeders according to the invention, determined by x-ray fluorescence analysis, is less than 1 wt. %, preferably less than 0.1 wt. %, A highly crystalline rice husk ash (a) to be employed according to the invention preferably has a grain size in the range of from 0.2 to 2 mm, particularly preferably a grain size in the range of from 0.2 to 1.5 mm. The fraction with the desired grain size is obtained by sieving. No grinding or pulverization of the rice husk ash is carried out.

The bulk density of a highly crystalline rice husk ash (a) to be employed in feeders according to the invention is typically 200 to 400 g/liter, preferably 200 to 300 g/liter.

The thermal conductivity of a highly crystalline rice husk ash (a) to be employed in feeders according to the invention is typically 0.12 to 0.13 W/mK at 100° C. and 0.39 to 0.4 W/mK at 1,000° C.

With respect to the thermal conductivity and the bulk density, the rice husk ash (a) to be employed in feeders according to the invention surprisingly has values comparable to the ceramic hollow spheres which are typically employed as a granular filler but which, as stated above, are not available without limitation. This conventional filler in feeders can therefore be partly or completely replaced by rice husk ash (a) which contains, based on the total amount of the constituents detectable in the rice husk ash by quantitative phase analysis by means of x-ray diffractometry (i) crystalline modifications of silicon dioxide, (ii) monoclinic feldspar and (iii) amorphous silicon dioxide, a total content of at least 70 wt. %, preferably more than 75 wt. % of (i) crystalline modifications of silicon dioxide and (ii) monoclinic feldspar, as is the case in the feeders according to the invention.

According to the invention. the use of highly crystalline rice husk ash (a) with the following features in feeders according to the invention is preferred:
  carbon content of less than 1 wt. %, preferably less than 0.1 wt. %, and/or
  grain size of from 0.2 to 2 mm, preferably 0.2 to 1.5 mm, and/or
  bulk density of (a) 200 to 400 g/liter, and/or
  thermal conductivity of from 0.12 to 0.13 W/mK at 100° C. and 0.39 to 0.4 W/mK at 1,000° C.
  Preferably, all these properties are present simultaneously.

The refractoriness of a highly crystalline rice husk ash (a) which can be employed in feeders according to the invention was determined by determining the pyrometric cone equivalent in accordance with DIN EN 933-12/13/DIN 51060, a reference temperature of >1,640° C. being determined.

A highly crystalline rice husk ash (a) to be employed in feeders according to the invention is obtainable by a procedure in which rice husk ash which contains, based on the total amount of the constituents detectable in the rice husk ash by quantitative phase analysis by means of x-ray diffractometry (i) crystalline modifications of silicon dioxide, (ii) monoclinic feldspar and (iii) amorphous silicon dioxide, a total content of less than 70 wt. % of (i) crystalline modifications of silicon dioxide and (ii) monoclinic feldspar is heat-treated at a temperature of at least 1,300° C., preferably at least 1,400° C., until, based on the total amount of the constituents detectable in the rice husk ash by quantitative phase analysis by means of x-ray diffractometry (i) crystalline modifications of silicon dioxide, (ii) monoclinic feldspar and (iii) amorphous silicon dioxide, the total content of (i) crystalline modifications of silicon dioxide and (ii) monoclinic feldspar has risen to at least 70 wt. %, preferably more than 75 wt. %.

A highly crystalline rice husk ash (a) to be employed in feeders according to the invention is obtainable, for example, by heat treatment of so-called black, i.e. carbon-rich rice husk ash at temperatures of at least 1,300° C., preferably at least 1,400° C. Black rice husk ash is obtainable, for example, under the product name Nermat AF from Refratechnik Casting GmbH. This type of rice husk ash comprises 92 to 97 wt. % of silicon dioxide and up to 5 wt. % of carbon, the remaining constituents being oxides of sodium, potassium, calcium, magnesium, aluminium and iron as well as carbon and water (as moisture and as water of crystallization). The silicon dioxide contained in this type of rice husk ash has a content of less than 55 wt. % in the form of crystalline modifications, i.e. at least 45 wt. %, typically more than 50 wt. % or even more than 55 wt. % of the silicon dioxide the rice husk ash contains is present as amorphous silicon dioxide. In this type of rice husk ash, the content of silicon dioxide present in the form of crystalline modifications predominantly comprises cristobalite and smaller proportions of tridymite and quartz. The particles of this type of rice husk ash have a blackish colour due to the relatively high carbon content. Because of its inadequate mechanical stability, this type of rice husk ash is of only limited suitability for use as a filler in feeders, and in particular this type of rice husk ash is not preferred for feeders produced by the cold box process.

At temperatures above about 1,300° C., preferably at least 1,400° C., this black rice husk ash—according to understanding to date from evaluation of our own studies—passes through a sintering process which effects grain consolidation. In this context, the content of the silicon dioxide contained in the rice husk ash which is present in the amorphous form is converted into crystalline modifications to the extent that the rice husk ash contains, based on the total amount of the constituents detectable in the rice husk ash by quantitative phase analysis by means of x-ray diffractometry (i) crystalline modifications of silicon dioxide, (ii) monoclinic feldspar and (iii) amorphous silicon dioxide, a total content of at least 70 wt. %, preferably more than 75 wt. % of (i) crystalline modifications of silicon dioxide and (ii) monoclinic feldspar, while the remaining content (iii) of the amorphous silicon dioxide in the total amount of rice husk ash constituents detectable by quantitative phase analysis by means of x-ray diffractometry is 30 wt. % or less. At the same time, the carbon the rice husk ash contains is largely oxidized, so that the originally blackish colour of the rice husk ash initially changes into a grey and finally into a pink colour shade.

In studies on the thermal sintering properties of black rice husk ash by means of a heating microscope, it was found that it sinters at temperatures of between 1,400 and 1,600° C., reached the hemispherical point at 1,720° C., and the flow point is >1,738° C. Due to the sintering process, the originally blackish rice husk ash assumes a stable grain form, so that the mechanical strength of the particles is increased. The consolidation achieved by the sintering process increases with increasing temperature of the heat treatment. The most favourable sintering temperature range is 1,400 to 1,500° C., since in this temperature range sintering of the rice husk ash does not yet lead to a consolidation of the particles with one another. Reaching of the pink colour shade can be used as an indication that the sintering process is complete. Black rice husk ash accordingly is heat-treated at a temperature of preferably at least 1,300° C., preferably between 1,400 and 1,500° C., at least until the rice husk ash has assumed a pink colour shade.

Highly crystalline rice husk ash (a) to be employed according to the invention which, as described above, was obtained by heat treatment at temperatures of at least 1,300° C., preferably at least 1,400° C., was investigated for its thermal sintering properties. In this context it was found that highly crystalline rice husk ash (a) to be employed according to the invention which has been heat-treated at temperatures of at least 1,300° C., preferably at least 1,400° C., has a higher temperature of the start of sintering than rice husk ash which has not been heat-treated at temperatures of at least 1,300° C., preferably at least 1,400° C. While the starting material for the rice husk ash to be employed in feeders according to the invention (Nermat AF) starts to sinter at 1,400° C., rice husk ash which has been heat-treated at a temperature of at least 1,300° C., preferably at least 1,400° C., shows a start of sintering at a temperature of 1,550° C. or higher. It is currently assumed that the conversion of amorphous silicon dioxide into crystalline modifications which takes place during sintering contributes towards a consolidation of the rice husk ash, so that the material stability necessary for use in feeders is achieved.

A feeder according to the invention comprises a cured binder (b). Cured binder (b) is understood as meaning the curing product of a binder or a binder system, wherein it is possible to employ all the binders and binder systems conventionally used for the production of feeders, e.g. thermosetting plastics, starch or silicate-forming agents, such as e.g. water-glass. Based on the total weight of the shapeable composition of the feeder, the amount of cured binder (b) is in the range of from 4 to 35 wt. %.

Preferably, the feeder according to the invention is produced by the cold box process. In this context, the binder system employed is advantageously a two-component system which comprises a phenolic resin containing free hydroxyl groups (OH groups) and a polyisocyanate as a reaction partner. By gassing with a tertiary amine, this binder system cures to a polyurethane. The cured binder accordingly is the curing product of a two-component system which comprises a phenolic resin containing free hydroxyl groups and a polyisocyanate as a reaction partner. In this binder system, the use of certain fatty acid methyl esters as a solvent, such as are described in the European patent application EP 0 804 980 A1, is preferred; among the fatty acid methyl esters, the use of rape oil methyl ester in turn is advantageous. However, the use of the cold box process for the production of the feeders according to the invention is not limited to the binders and solvents described in EP 0 804 980 A1, further binder compositions and process techniques which are suitable for the cold box process can be found in the European patent specifications EP 0 888 199 B1 and EP 0 913 215 B1. The disclosure of the EP publications mentioned is a constituent of the present text by way of reference. The feeder compositions disclosed in each case there become compositions according to the invention by partial or complete replacement of one or more of the fillers mentioned there by highly crystalline rice husk ash (a).

In some cases, a feeder according to the invention comprises further fillers (d) in addition to the highly crystalline rice husk ash (a) described above which contains, based on the total amount of the constituents detectable in the rice husk ash by quantitative phase analysis by means of x-ray diffractometry (i) crystalline modifications of silicon dioxide, (ii) monoclinic feldspar and (iii) amorphous silicon dioxide, a total content of at least 70 wt. %, preferably more than 75 wt. % of (i) crystalline modifications of silicon dioxide and (ii) monoclinic feldspar. For example, the feeder according to the invention can also contain, in addition to rice husk ash (a) which contains, based on the total amount of the constituents detectable in the rice husk ash by quantitative phase analysis by means of x-ray diffractometry (i) crystalline modifications of silicon dioxide, (ii) monoclinic feldspar and (iii) amorphous silicon dioxide, a total content of at least 70 wt. %, preferably more than 75 wt. % of (i) crystalline modifications of silicon dioxide and (ii) monoclinic feldspar, (d) hollow spheres (as described above) conventionally used as a lightweight filler, i.e. in comparison with conventional feeders the hollow spheres (d) are only partly replaced by the highly crystalline rice husk ash (a) described above. If the feeder according to the invention contains hollow spheres as a further filler (d), the total amount, based on the total weight of the shapeable composition, of (a) highly crystalline rice husk ash and (d) hollow spheres is in the range of from 5 to 90 wt. %, preferably from 5 to 25 wt. %, the weight ratio of (a) highly crystalline rice husk ash to (d) hollow spheres being at least 0.1. However, the exclusive use of highly crystalline rice husk ash is particularly preferred according to the invention.

Other fillers (d) are chosen from the group consisting of kaolin, sand, quartz sand, fireclay sand and/or coke grit as well as finely disperse, inert metal oxides, such as those of titanium, aluminium or silicon and those types of rice husk ash which contains, based on the total amount of the constituents detectable in the rice husk ash by quantitative phase analysis by means of x-ray diffractometry (i) crystalline modifications of silicon dioxide, (ii) monoclinic feldspar and (iii) amorphous silicon dioxide, a total content of less than 70 wt. % of (i) crystalline modifications of silicon dioxide and (ii) monoclinic feldspar. That is to say the content (iii) of amorphous silicon dioxide in the total amount of rice husk ash constituents detectable by quantitative phase analysis by means of x-ray diffractometry is greater than 30 wt. %, possibly even greater than 40 wt. %. Such rice husk ash is obtainable, for example, under the product name Nermat AF from Refratechnik Casting GmbH. If the feeder is produced by the slurry process, the carbon-rich black rice husk ash e.g. of the abovementioned Nermat AF type is also suitable as a filler. However, the presence of this type of rice husk ash is not preferred in a cold box process for the production of feeders according to the invention. If the feeder according to the invention contains as a further filler (d) rice husk ash which contains, based on the total amount of the constituents detectable in the rice husk ash by quantitative phase analysis by means of x-ray diffractometry (i) crystalline modifications of silicon dioxide, (ii) monoclinic feldspar and (iii) amorphous silicon dioxide, a total content of less than 70 wt. % of (i) crystalline modifications of silicon dioxide and (ii) monoclinic feldspar, the amount of such rice husk ash (d), based on the total weight of the shapeable composition of the feeder, being at most 10 wt. %.

The presence of fibre material (c) in feeders according to the invention is often advantageous, because fibres have the effect of an additional reinforcement of the feeder. Organic fibre materials are preferably employed, while the use of inorganic fibre materials should be omitted. Omitting inorganic fibre materials in this way allows a production of feeders according to the invention which is acceptable in health terms, since particles which can enter the lungs may break off from inorganic fibre. Cellulose fibres are preferably employed in feeders according to the invention, since these are distinguished by their low weight. In this context, the fibre length of the cellulose fibres employed is preferably in the range of from 30 to 800 μm.

A shapeable composition according to the invention for the production of feeders for the foundry industry comprises
(a) highly crystalline rice husk ash containing, based on the total amount of the constituents detectable in the rice husk ash by quantitative phase analysis by means of x-ray diffractometry
    (i) crystalline modifications of silicon dioxide,
    (ii) monoclinic feldspar and
    (iii) amorphous silicon dioxide,
    a total content of at least 70 wt. %, preferably more than 75 wt. % of
    (i) crystalline modifications of silicon dioxide and
    (ii) monoclinic feldspar,
    wherein, based on the total weight of the shapeable composition, the amount of this highly crystalline rice husk ash is in the range of from 5 to 50 wt. %, preferably 5 to 25 wt. %,
(b) binder,
(c) optionally fibre material,
(d) optionally one or more further fillers, and
(e) optionally (for exothermic feeders) at least one oxidizable metal (such as aluminium, magnesium or silicon) and an oxidizing agent for the oxidizable metal.

With respect to the preparation and further properties and features of the rice husk ash (a) to be employed for the shapeable composition according to the invention and preferred binders (b), fibre materials (c) and further fillers (d), reference is made to the above statements. A binder system can also be employed as the binder (b).

If the shapeable composition according to the invention contains hollow spheres as a further filler (d), the total amount, based on the total weight of the shapeable composition, of (a) highly crystalline rice husk ash and (d) hollow spheres is in the range of from 5 to 90 wt. %, preferably from 5 to 25 wt. %, the weight ratio of (a) highly crystalline rice husk ash to (d) hollow spheres being at least 0.1. However, the exclusive use of highly crystalline rice husk ash (a) is particularly preferred according to the invention.

If the shapeable composition according to the invention contains as a further filler (d) rice husk ash in which a content of less than 70% of the contained silicon dioxide is present in the form of crystalline modifications, the amount of such rice husk ash (d), based on the total weight of the shapeable composition, is at most 10 wt. %.

A process for the preparation of a shapeable composition for the production of feeders for the foundry industry, comprising the steps
    provision of a highly crystalline rice husk ash (a) which contains, based on the total amount of the constituents detectable in the rice husk ash by quantitative phase analysis by means of x-ray diffractometry (i) crystalline modifications of silicon dioxide, (ii) monoclinic feldspar and (iii) amorphous silicon dioxide, a total content of at least 70 wt. %, preferably more than 75 wt. % of (i) crystalline modifications of silicon dioxide and (ii) monoclinic feldspar,
    mixing of the highly crystalline rice husk ash (a) provided with (b) binder, (c) optionally fibre material and (d) optionally one or more further fillers and (e) optionally (for the production of an exothermic feeder) an oxidizable metal (such as aluminium, magnesium or silicon) and an oxidizing agent for the oxidizable metal, so that, based on the total weight of the shapeable composition, the amount of rice husk ash (a) which contains, based on the total amount of the constituents detectable in the rice husk ash by quantitative phase analysis by means of x-ray diffractometry (i) crystalline modifications of silicon dioxide, (ii) monoclinic feldspar and (iii) amorphous silicon dioxide, a total content of at least 70 wt. %, preferably more than 75 wt. % of (i) crystalline modifications of silicon dioxide and (ii) monoclinic feldspar, in the shapeable composition is in the range of from 5 to 50 wt. %, preferably 5 to 25 wt. %.

Rice husk ash (a) which is suitable for the preparation of the shapeable composition according to the invention is obtainable by a procedure in which rice husk ash which contains, based on the total amount of the constituents detectable in the rice husk ash by quantitative phase analysis by means of x-ray diffractometry (i) crystalline modifications of silicon dioxide, (ii) monoclinic feldspar and (iii) amorphous silicon dioxide, a total content of less than 70 wt. % of (i) crystalline modifications of silicon dioxide and (ii) monoclinic feldspar, is heat-treated at a temperature of at least 1,300° C. until, based on the total amount of the constituents detectable in the rice husk ash by quantitative phase analysis by means of x-ray diffractometry, (i) crystalline modifications of silicon dioxide, (ii) monoclinic feldspar and (iii) amorphous silicon dioxide, the total content of (i) crystalline modifications of silicon dioxide and (ii) monoclinic feldspar has risen to at least 70 wt. %, preferably more than 75 wt. %. The heat treatment is preferably carried out at a temperature of between 1,400 and 1,500° C.

The carbon content of rice husk ash before the heat treatment is up to 5 wt. %. During the heat treatment, the carbon contained in the rice husk ash is largely oxidized, so that the originally blackish colour of the rice husk ash changes into an initially grey and finally pink colour shade. Reaching of the pink colour shade can in general be used as an indication that the heat treatment is complete, i.e. the desired content of crystalline modifications on the silicon dioxide contained in the rice husk ash has been reached. The rice husk ash is therefore preferably heat-treated at least until it has assumed a pink colour shade.

For production of a feeder according to the invention, the shapeable composition according to the invention is shaped into a feeder and the shaped feeder is cured. The operation of shaping in this context is preferably carried out by the slurry process (filter-slip process), the green stand process, or the cold box process or the hot box process, the cold box process being particularly preferably employed.

EMBODIMENT EXAMPLES

Example 1

In a first experiment, rice husk ash of the Nermat AF type (Refratechnik Casting GmbH) was heat-treated in a high temperature furnace at 1,600° C. The heating up rate was 6 K/min, the holding time at the maximum temperature being 10 minutes. Thereafter, the originally blackish rice husk ash had assumed a pink colour shade. The following proportions of amorphous silicon dioxide, of cristobalite, of quartz and of tridymite were determined by quantitative phase analysis of the rice husk ash by means of x-ray diffractometry before and after the heat treatment (Table 1):

TABLE 1

| | Sample | |
|---|---|---|
| | Starting material Nermat AF | After heat treatment at 1,600° C. |
| Phase | Prportion of the total content of SiO$_2$ wt. % | Proportion of the total content of SiO$_2$ wt. % |
| Amorphous | 56.4 | 24.0 |
| Cristobalite | 39.7 | 73.2 |
| Quartz | 0.6 | 0.4 |
| Tridymite | 3.3 | 2.4 |

As a result of the heat treatment, the content (iii) of amorphous silicon dioxide in the total amount of the constituents of the rice husk ash detectable by quantitative phase analysis by means of x-ray diffractometry fell to less than 25 wt. %, while the content (i) of crystalline modifications (predominantly cristobalite) of silicon dioxide rose to more than, 75 wt. %.

Example 2

Further sintering experiments with rice husk ash of the Nermat AF type (Refratechnik Casting GmbH) were carried out in a tunnel furnace with various full fire temperatures (1,400° C., 1,480° C. and 1,550° C.). A pink-colour product was obtained at each temperature. The following contents of (iii) amorphous silicon dioxide, of (i) crystalline modifications (cristobalite, quartz, tridymite) and of (ii) monoclinic feldspar were determined by quantitative phase analysis of the rice husk ash by means of x-ray diffractometry before and after the heat treatment (Table 2):

TABLE 2

| | Sample | | | |
|---|---|---|---|---|
| | Starting material | After heat treatment at | | |
| Phase | Nermat AF Content wt. % | 1,400° C. Content wt. % | 1,480° C. Content wt. % | 1,550° C. Content wt. % |
| Amorphous | 56.4 | 6 | 5.9 | 3.2 |
| Cristobalite | 39.7 | 23.1 | 33.6 | 21.5 |
| Tridymite | 3.3 | 67.3 | 57.4 | 72.5 |
| Quartz | 0.6 | 0.6 | 0.4 | 0.5 |
| Monoclinic feldspar | — | 3.0 | 2.7 | 2.3 |

Regardless of the full fire temperature, a substantial conversion of amorphous silicon dioxide (iii) into (i) crystalline modifications of silicon dioxide and where applicable into (ii) silicon dioxide as a constituent of monoclinic feldspar took place in all cases, so that after the heat treatment the content of silicon dioxide present in the amorphous form in the total amount of the rice husk ash constituents detectable by quantitative phase analysis by means of x-ray diffractometry was in each case less than 10 wt. %.

Example 3

Two samples of pink-coloured rice husk ash and two samples of the rice husk ash commercially obtainable under the product name Nermat AF from Refratechnik Casting GmbH were investigated with respect to the mineralogical composition. The results are as follows (Table 3):

TABLE 3

| | Sample | | | |
|---|---|---|---|---|
| Phase | Nermat AF Sample 1 Content wt. % | Nermat AF Sample 2 Content wt. % | Pink rice husk ash Sample 1 Content wt. % | Pink rice husk ash Sample 2 Content wt. % |
| Amorphous | 56.4 | 44.0 | 16.4 | 14.3 |
| Cristobalite | 39.7 | 20.4 | 28.3 | 27.7 |
| Tridymite | 3.3 | 30.9 | 50.6 | 41.2 |
| Quartz | 0.6 | 1.8 | 1.2 | 13.1 |
| Monoclinic feldspar | — | 2.9 | 0.7 | 3.7 |

The total amount of the constituents detectable in the rice husk ash by quantitative phase analysis by means of x-ray diffractometry, (i) crystalline modifications of silicon dioxide, (ii) monoclinic feldspar and (iii) amorphous silicon dioxide has a content of (iii) amorphous silicon dioxide of less than 17 wt. % (Sample 1) or even less than 15 wt. % (Sample 2), while a content of more than 80 wt. % and, respectively, more than 85 wt. % of the rice husk ash constituents detectable by quantitative phase analysis by means of x-ray diffractometry is formed by (i) crystalline modifications of silicon dioxide and (ii) monoclinic feldspar. The deviations in the mineralogical composition of the two samples of Nermat AF and pink-coloured rice husk ash are to be attributed to them belonging to different batches. As a natural product, the starting material of the rice husk ash undeniably is subject to certain quality variations.

Example 4

Rice husk ash of the Nermat AF type (Refratechnik Casting GmbH) was heat-treated in a high temperature furnace at 1,400° C. Before and after the heat treatment, the chemical composition of the rice husk ash was determined by means of x-ray fluorescence analysis. The results are as follows (Table 4):

TABLE 4

| | Starting material Nermat AF [wt. %] | After heat treatment at 1,400° C. [wt. %] |
|---|---|---|
| Silicon dioxide | 91.62 | 96.07 |
| Potassium oxide | 2.40 | 1.89 |
| Sodium oxide | 0.00 | 0.00 |
| Calcium oxide | 0.90 | 1.04 |
| Magnesium oxide | 0.47 | 0.41 |
| Aluminium oxide | 0.00 | 0.00 |
| Iron(iii) oxide | 0.25 | 0.23 |
| Carbon | 1.90 | 0.04 |

The carbon content is significantly decreased by the sintering process.

The total content of silicon dioxide determined in the chemical analysis is composed of amorphous silicon dioxide, the crystalline modifications of silicon dioxide (cristobalite, tridymite and quartz) and where applicable silicon dioxide as a constituent of monoclinic feldspar.

Example 5: Production and Use of Feeder Caps

Two shapeable compositions according to the invention were employed for the production of feeder caps. The first shapeable composition according to the invention (Example 5a, Table 5a) is an insulating composition, the second shapeable composition according to the invention (Example 5b, Table 5b) being an exothermic feeder heating composition. For comparison, feeder caps were produced from a conventional insulating composition and a conventional exothermic feeder heating composition.

TABLE 5a (Example 5a, PW = parts by weight):

|  | Conventional insulating feeder composition | Insulating feeder composition according to the invention |
|---|---|---|
| Hollow spheres | 100 PW | 50 PW |
| Highly crystalline rice husk ash | — | 50 PW |
| Cold box binder | 16 PW | 16 PW |

TABLE 5b (Example 5b, PW = parts by weight):

|  | Conventional exothermic feeder heating composition | Exothermic feeder heating composition according to the invention |
|---|---|---|
| Aluminium grit | 30 PW | 30 PW |
| Iron oxide | 6 PW | 8 PW |
| Oxidizing agent | 16 PW | 16 PW |
| Filler and additive | 21 PW | 18 PW |
| Hollow spheres | 27 PW | — |
| Highly crystalline rice husk ash | — | 28 PW |
| Cold box binder | 12 PW | 16 PW |

Regardless of the shapeable composition employed, the production of the feeder caps comprises the steps
homogeneous mixing of the solid components of the shapeable composition,
addition of the binder,
shaping of the feeder cap,
curing of the feeder cap.

The shapeable compositions according to the invention employed, of Examples 5a and 5b, prove to be suitable for the production of feeder caps. It was found in casting experiments that in spite of the lower content of hollow spheres, feeder caps comprising shapeable compositions according to the invention scarcely differ from feeder caps from conventional feeder compositions with respect to their cooling properties. This is shown e.g. by the comparison of the cooling curves of the feeder cap comprising an exothermic shapeable composition according to the invention and of the feeder cap comprising a conventional exothermic shapeable composition from Example 5b (FIG. 1).

The invention claimed is:

1. Feeder for use in the foundry industry, comprising
   (a) rice husk ash containing, based on the total amount of the constituents detectable in the rice husk ash by quantitative phase analysis by means of x-ray diffractometry
      (i) crystalline modifications of silicon dioxide,
      (ii) monoclinic feldspar and
      (iii) amorphous silicon dioxide,
      a total content of at least 70 wt. % of
      (i) crystalline modifications of silicon dioxide and
      (ii) monoclinic feldspar,
   (b) cured binder,
   (c) optionally fibre material,
   (d) optionally one or more further fillers,
   (e) optionally an oxidizable metal and an oxidizing agent for the oxidizable metal.

2. Feeder according to claim 1, characterized in that the content of the silicon dioxide contained in the rice husk ash which is present in the form of crystalline modifications contains proportions of one or more crystalline modifications of silicon dioxide from the group consisting of cristobalite, tridymite and quartz.

3. Feeder according to claim 1, characterized in that
   the carbon content of the rice husk ash (a) is less than 1 wt. %, and/or
   the grain size of the rice husk ash (a) is 0.2 to 2 mm, and/or
   the bulk density of the rice husk ash (a) is 200 to 400 g/liter, and/or
   the thermal conductivity of the rice husk ash (a) is 0.12 to 0.13 W/mK at 100° C. and 0.39 to 0.4 W/mK at 1,000° C.

4. Feeder according to claim 1, characterized in that the cured binder (b) is the curing product of a two-component system which comprises a phenolic resin containing free hydroxyl groups and a polyisocyanate as a reaction partner.

5. Feeder according to claim 1, characterized in that it contains hollow spheres as a further filler (d),
   wherein, based on the total weight of the shapeable composition of the feeder, the total amount of
   (a) rice husk ash containing, based on the total amount of the constituents detectable in the rice husk ash by quantitative phase analysis by means of x-ray diffractometry (i) crystalline modifications of silicon dioxide, (ii) monoclinic feldspar and (iii) amorphous silicon dioxide, a total content of at least 70 wt. % of (i) crystalline modifications of silicon dioxide and (ii) monoclinic feldspar,
   and
   (d) hollow spheres
   is in the range of from 5 to 90 wt. %, and the weight ratio of the rice husk ash (a) to hollow spheres (d) is at least 0.1.

6. Feeder according to claim 1, characterized in that it contains as a further filler (d) rice husk ash which contains, based on the total amount of the constituents detectable in the rice husk ash by quantitative phase analysis by means of x-ray diffractometry (i) crystalline modifications of silicon dioxide, (ii) monoclinic feldspar and (iii) amorphous silicon dioxide, a total content of less than 70 wt. % of (i) crystalline modifications of silicon dioxide and (ii) monoclinic feldspar, and, based on the total weight of the shapeable composition of the feeder, the amount of such rice husk ash (d) is at most 10 wt. %.

7. Shapeable composition for the production of feeders for the foundry industry, comprising
   (a) rice husk ash containing, based on the total amount of the constituents detectable in the rice husk ash by quantitative phase analysis by means of x-ray diffractometry
      (i) crystalline modifications of silicon dioxide,
      (ii) monoclinic feldspar and
      (iii) amorphous silicon dioxide, a total content of at least 70 wt. % of
      (i) crystalline modifications of silicon dioxide and
      (ii) monoclinic feldspar,
   (b) binder,
   (c) optionally fibre material,
   (d) optionally one or more further fillers, (e) optionally at least one oxidizable metal and an oxidizing agent for the oxidizable metal.

8. Shapeable composition according to claim 7, characterized in that the binder (b) is a two-component system which comprises a phenolic resin containing free hydroxyl groups (OH groups) and a polyisocyanate as a reaction partner.

9. Shapeable composition according to claim 7, characterized in that
it contains hollow spheres as a further filler (d),
wherein, based on the total weight of the shapeable composition, the total amount of
(a) rice husk ash containing, based on the total amount of the constituents detectable in the rice husk ash by quantitative phase analysis by means of x-ray diffractometry (i) crystalline modifications of silicon dioxide, (ii) monoclinic feldspar and (iii) amorphous silicon dioxide, a total content of at least 70 wt. % of (i) crystalline modifications of silicon dioxide and (ii) monoclinic feldspar,
and
(d) hollow spheres
is in the range of from 5 to 90 wt. %, and the weight ratio of the rice husk ash (a) to hollow spheres (d) is at least 0.1.

10. Shapeable composition according to claim 7, characterized in that it contains as a further filler (d) rice husk ash which contains, based on the total amount of the constituents detectable in the rice husk ash by quantitative phase analysis by means of x-ray diffractometry (i) crystalline modifications of silicon dioxide, (ii) monoclinic feldspar and (iii) amorphous silicon dioxide, a total content of less than 70 wt. % of (i) crystalline modifications of silicon dioxide and (ii) monoclinic feldspar,
and, based on the total weight of the shapeable composition, the amount of such rice husk ash (d) in which a content of less than 70% of the contained silicon dioxide is present in the form of crystalline modifications, is at most 10 wt. %.

11. Process for the preparation of a shapeable composition for the production of feeders for the foundry industry, comprising the steps
provision of a rice husk ash (a) containing, based on the total amount of the constituents detectable in the rice husk ash by quantitative phase analysis by means of x-ray diffractometry (i) crystalline modifications of silicon dioxide, (ii) monoclinic feldspar and (iii) amorphous silicon dioxide, a total content of at least 70 wt. % of (i) crystalline modifications of silicon dioxide and (ii) monoclinic feldspar,
mixing of the rice husk ash (a) provided with
(b) binder,
(c) optionally fibre material and
(d) optionally one or more further fillers
(e) optionally an oxidizable metal and an oxidizing agent for the oxidizable metal, so that, based on the total weight of the shapeable composition, the amount of rice husk ash (a) which contains, based on the total amount of the constituents detectable in the rice husk ash by quantitative phase analysis by means of x-ray diffractometry (i) crystalline modifications of silicon dioxide, (ii) monoclinic feldspar and (iii) amorphous silicon dioxide, a total content of at least 70 wt. % of (i) crystalline modifications of silicon dioxide and (ii) monoclinic feldspar, in the shapeable composition is in the range of from 5 to 50 wt.

12. Process according to claim 11, characterized in that rice husk ash which contains, based on the total amount of the constituents detectable in the rice husk ash by quantitative phase analysis by means of x-ray diffractometry (i) crystalline modifications of silicon dioxide, (ii) monoclinic feldspar and (iii) amorphous silicon dioxide, a total content of less than 70 wt. % of (i) crystalline modifications of silicon dioxide and (ii) monoclinic feldspar, is heat-treated at a temperature of at least 1,300° C. until, based on the total amount of the constituents detectable in the rice husk ash by quantitative phase analysis by means of x-ray diffractometry (i) crystalline modifications of silicon dioxide, (ii) monoclinic feldspar and (iii) amorphous silicon dioxide, the total content of (i) crystalline modifications of silicon dioxide and (ii) monoclinic feldspar has risen to at least 70 wt. %.

13. Process according to claim 11, characterized in that the heat treatment is carried out at a temperature of between 1,400 and 1,500° C.

14. Process according to claim 11, characterized in that the rice husk ash is heat-treated at least until it has assumed a pink colour shade.

* * * * *